Patented Feb. 10, 1925.

1,525,808

UNITED STATES PATENT OFFICE.

SELDEN H. HALL, OF POUGHKEEPSIE, NEW YORK, ASSIGNOR TO THE DE LAVAL SEPARATOR COMPANY, OF NEW YORK, N. Y., A CORPORATION OF NEW JERSEY.

PROCESS OF CENTRIFUGALLY SEPARATING INGREDIENTS ONE OF WHICH IS RESISTANT TO FLOW AND CENTRIFUGAL BOWL FOR CARRYING OUT SAID PROCESS.

Application filed February 15, 1923. Serial No 619,130.

*To all whom it may concern:*

Be it known that I, SELDEN H. HALL, a citizen of the United States, residing at Poughkeepsie, county of Dutchess and State of New York, have invented a new and useful Improvement in Processes of Centrifugally Separating Ingredients One of Which is Resistant to Flow and Centrifugal Bowl for Carrying Out said Processes, of which the following is a full, clear, and exact description, reference being had to the accompanying drawings, which form a part of this specification.

In mixtures of ingredients one or both of which are not free flowing and which cannot be made free flowing by heat applied to the mixture without throwing the ingredients into solution, great difficulty has been experienced in separating them by centrifugal means. Thus, in solutions of mineral oil and wax, which are diluted with naphtha and refrigerated to precipitate the wax, while the wax, under the influence of centrifugal force, readily separates from the oil and forms a circumferential zone of wax in the bowl, its consistency is such, especially in the case of the centrifuging of wax distillates, that it tends to adhere to and pile up on the inner wall of the bowl and clog up the discharge passages until the bowl no longer functions, or functions very imperfectly, necessitating such frequent stoppages for cleaning as to render the operation uneconomical and in some cases impracticable. In some instances, as in the separation of amorphous wax from cylinder stock derived from certain grades of crude petroleum, the wax discharges fairly well, if the most efficient type of centrifuge is used, but tends to clog up the outflow conduits of the stationary receiving pans, which causes a back flow of wax into the space between the frame and the bowl.

These conditions have been rectified, in greater or less degree, by various expedients, all of which have in common the application of heat to the separated wax to render it more free flowing. Thus, heat has been applied to the outer surface of the zone of wax in the bowl, to the wax as it emerges from the bowl outlet, and to the receiving pans. These expedients have attained a measure of success with some mixtures of wax and oil and with the most efficient type of centrifuge.

However, whether the wax is so heated or not, there is a tendency for the wax to flow more sluggishly from some sections of the bowl than from others. In the sections of more sluggish flow the wax tends to become harder. Thus the difference in the rate of flow in different sections of the bowl increases until the flow stops entirely in some sections and becomes abnormally rapid in others.

One object of my invention is to provide for heating the wax in its passage from the separating zone to the wax outlet and particularly to so heat it by electricity. Another and more important object of the invention is to provide that any reduction in the rate of flow from one section shall be automatically followed by an increase in fluidity of the material flowing from that section so as to increase its rate of flow; and conversely, to provide that any abnormal increase in the rate of flow from one section shall be automatically followed by a decrease in the fluidity of the material flowing from that section. In other words, the object of the invention is to provide a separating bowl that will possess an inherently self-equalizing tendency for the rate of flow from different sections.

The attainment of this purpose involves the employment of a new process; and while this process is not limited to the employment of any particular construction, I have devised a new and advantageous structure, which is illustrated in the drawings and wherein—

The spindle $a$ supports and drives the bowl, which comprises a member $b$, forming a bowl bottom and shell, and a member $c$ forming the bowl top proper and held to the shell by a coupling ring $d$. This bowl top has a petticoat $e$ supporting the ends of a plurality of outlet tubes $f$ through which the heavier material flows toward a discharge weir $h$. A top disc $i$ provides a separating wall between the outflowing heavy material and the outflowing light material and has an upstanding neck provided with a weir $k$ for the control of the lighter material.

The material to be separated is supplied by the faucet $y$ to the feed cup $x$ and flows downward through the regulating tube $w$ and the central tubular shaft $n$, whence it discharges in a radial direction into the bottom of the bowl. A multiplicity of conically shaped "discs," constituting a "liner" $z$, is inserted into the interior of the bowl, thus providing a number of separating chambers of small lateral dimensions, as is well known in the art.

Figure 1:
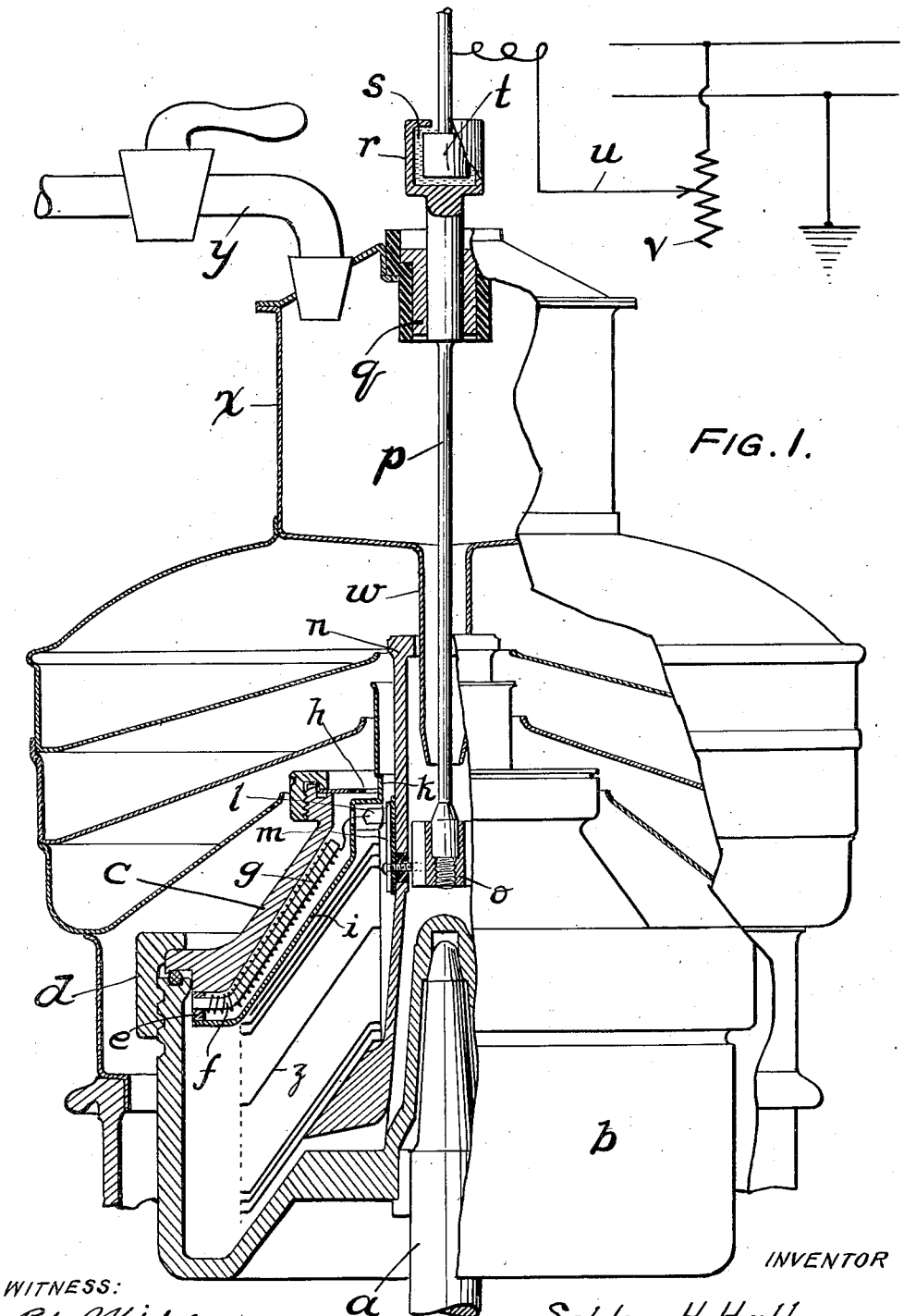
Fig. 1 is a vertical cross-section through the centrifugal bowl.
Figure 2:
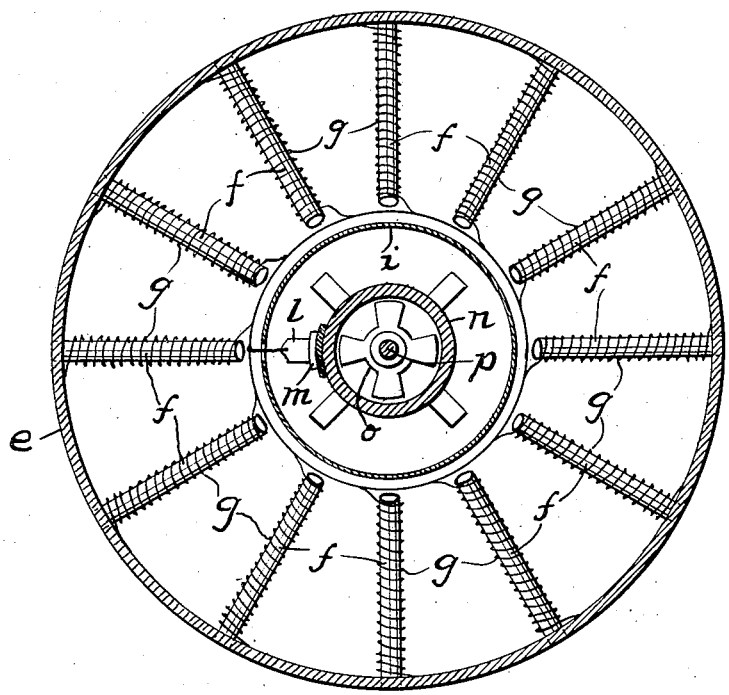
Fig. 2 is a plan view with the bowl top removed.

The outlet tubes $f$ are surrounded by coils $g$ of electrically heated wires. One terminal of each electric heating unit is grounded to the bowl top (see Fig. 2), while the other terminal is connected to an insulated button $l$ in contact with a spring $m$. This spring is insulated from the tubular shaft $n$, but is electrically connected to a socket $o$. From this socket a conductor $p$ extends upward, through a steadying bearing $q$, to a cylinder $r$. This cylinder contains mercury $s$ around a stationary conductor $t$, which is connected by a wire $u$ with a regulating rheostat $v$ and one side of an electric supply line. The other side of the line is grounded on the frame of the machine.

The mixture to be centrifuged is admitted to the separating spaces of the liner as above described and is therein separated. The lighter ingredient flows toward the center and up over the weir $k$ and escapes from the extreme top of the neck of the top disc $i$. The heavier ingredient flows outward and collects against the bowl wall until the layer is thick enough to start the ingredient outflowing through the electrically heated tubes $f$ and up over the weir $h$.

Assume that the material to be separated is wax and mineral oil and that the original solution of wax and oil has been chilled to the degree required to precipitate the wax or throw it out of solution. The material that was chilled may be oil containing all the wax present in the crude petroleum, which wax may be in the so-called intermediate state; or it may be the cylinder stock remaining after the lubricating distillates have been distilled off, the wax then being in an amorphous condition; or it may be one or more of the lubricating distillates themselves, which contain wax in a crystalline condition. After chilling any of these products, the wax is in a plastic, viscous or semifluid condition, or one more or less approaching solidity, and hence, in many cases, cannot be continuously discharged from an ordinary centrifugal bowl, but clogs and stops up the outlet or adheres to and accumulates upon the bowl wall. As hereinbefore stated, with certain of these wax and oil mixtures, more or less success in discharging the wax has been achieved by the expedient of heating the separated wax to make it more free flowing, either by heating the outside wall of the zone of wax in the bowl, or by heating the wax while it is discharging therefrom, or after it has been discharged into the receiving pans; care, of course, being taken to avoid heating the whole zone of wax in the bowl, as this would throw the wax back into solution with the oil. In all cases, however, whether or not some heat has been applied to the wax to render it more free flowing, the wax tends to flow more sluggishly from some sections of the bowl than from others and tends to become harder in the sections of sluggish flow, thus increasing the difference in the rate of flow until the flow stops entirely in some sections and becomes abnormally rapid in others, as hereinbefore explained.

By discharging the wax through a series of electrically heated tubes, I not only provide a convenient and efficient method of rendering the wax more free flowing, but I entirely overcome the tendency of the wax to flow more sluggishly from some sections of the bowl than from others. This will be clear from the following explanation.

The fluidity of the wax increases with increase of temperature. The tubes $f$ are all of the same diameter and length. The coils supplied to the tubes are all of equal size and the same current flows through all of them. Therefore, the quantity of heat supplied to any one tube is the same as that supplied to any other tube. The temperature of each tube will vary inversely with the rate of removal of heat, which in turn varies with the rate of flow of material through the tube. If the wax stops flowing through any tube, the temperature of that tube will rapidly rise and soften the wax until is flows easily. If the rate of flow through any tube becomes abnormally rapid, the temperature of the tube will fall and the wax will become stiffer and its flow become slower. It will therefore be clear that the effective tendency is not toward a more rapid or sluggish flow of wax in some sections of the bowl than in others, but toward an equality of flow in all sections of the bowl.

It will be understood that it is not necessary to have the outflow passages in the form of pipes; and that while electrical heating of the discharge passages is distinctly advantageous, any means of supplying approximately equal quantities of heat to the several passages will be effective to prevent a substantial departure from equality of outflow in different parts of the bowl.

It will also be understood that while I have specified three different oil and wax mixtures to which my invention is applicable, it is equally applicable to the separation of any two ingredients, either or both of which so nearly approach a solid condition as to resist free discharge or tend to flow more sluggishly from some sections of the bowl than from other sections, as for example, stearin from fats; pitch, tar and acid sludge from oils, etc. In all such mixtures, the application of heat tends to render any sluggish substance more free flowing. It is obvious, however, that the invention will find its most useful application to those mixtures one of whose ingredients is not free flowing when separated and which cannot be made free flowing by heating the entire mixture without causing it to dissolve in the other ingredient. While mixtures of this character are not numerous, they are not confined to the mineral oil and wax mixtures herein specifically mentioned.

It will be understood that where, in the claims, I refer to increasing or decreasing fluidity, I refer to capacity to flow and do not mean to imply that the material is necessarily actually in a fluid condition, as it may be in a more nearly solid condition and is in most cases in what may be called a plastic condition.

Having now fully described my invention, what I claim and desire to protect by Letters Patent is:

1. The process of centrifugally separating ingredients the heavier of which has been thrown out of solution by refrigeration and which thereby has been rendered relatively non-free flowing, which comprises subjecting the mixture of ingredients to centrifugal force to effect separation, flowing the separated ingredients to separate discharges, and elevating the temperature of substantially only that part of the heavier ingredient which at any given time is flowing from the locus of separation to its discharge, while maintaining the heating medium out of direct conduct with said discharging stream, whereby said ingredients are separated during maintenance at a relatively low temperature while the separated heavier ingredient is nevertheless discharged without clogging and is removed in a single separating operation.

2. The process of centrifugally separating ingredients the heavier of which has been thrown out of solution by refrigeration and which thereby has been rendered relatively non-free flowing, which comprises subjecting the mixture of ingredients to centrifugal force to effect separation, flowing the lighter ingredient to one discharge, conveying the relatively non-free flowing ingredient from the locus of separation to another discharge in a flowing stream of restricted cross-section, and applying heat peripherally to the flowing stream to heat it to a temperature above that within the separating compartment while maintaining said heating medium out of direct contact with such ingredient.

3. The process of treating a mixture of ingredients one of which is relatively non-free flowing, which comprises subjecting the ingredients to centrifugal force to effect their separation, separately outflowing the thus separated ingredients, and electrically heating locally the non-free flowing ingredient in its flow from the locus of separation to the discharge.

4. The process of centrifugally separating ingredients one of which is relatively non-free flowing which comprises applying centrifugal force to arrange the ingredients in concentric zones, outflowing the material from the zone containing the relatively non-free flowing ingredient in a plurality of separate similar streams and increasing the fluidity of such ingredient while in said outflowing streams.

5. The process of centrifugally separating ingredients one of which is non-free flowing which comprises discharging such ingredient from the zone of separation in a plurality of separate similar streams, and applying substantially equal quantities of heat to the several streams.

6. The process of centrifugally separating ingredients one of which is non-free flowing which comprises discharging such ingredient from the zone of separation through a plurality of passages and in each of said passages varying the fluidity of the ingredient inversely as the rate of flow therethrough.

7. The process of centrifugally separating ingredients one of which is non-free flowing which comprises discharging such ingredient from the zone of separation through a plurality of passages and in each of said passages varying the fluidity of the ingredient inversely as the rate of flow therethrough.

8. The process of centrifugally separating ingredients one of which is non-free flowing which comprises discharging such ingredients from the zone of separation through a plurality of passages, and in each of said passages varying the resistance to flow directly as the rate of flow therethrough.

9. The process of centrifugally separating ingredients one of which is non-free flowing which comprises discharging such ingredient from the zone of separation through a plurality of passages and approximately equalizing the flow through the several passages by varying the resistance to flow in one passage inversely to the rate of flow in another.

10. The process of centrifugally separating ingredients one of which is non-free flowing which comprises discharging such ingredient from the zone of separation through a plurality of passages and approximately equalizing the flow through the several passages by varying the heat absorbed by the ingredients flowing through the several passages inversely as the respective rates of flow therethrough whereby a tendency in any one passage to flow relatively sluggishly is overcome by raising the temperature of the ingredient in such passage and thus rendering it more free flowing while a tendency in any one passage to flow relatively too freely is overcome by lowering the temperature of the ingredient in such passage and thus making it flow more sluggishly.

11. In a centrifugal bowl for separating ingredients one of which is relatively resistant to flow, the combination with a separating compartment, of means providing a discharge for the lighter ingredient and a separate discharge passage for the heavier ingredient whose cross-sectional dimensions are restricted relatively to its length and through which such ingredient flows from the peripheral part of the separating compartment to the bowl outlet, and heating means exterior to said passage to heat the same locally.

12. The combination of a centrifugal bowl provided with a separating compartment for separating ingredients the heavier of which is resistant to flow and having separate outlets for said ingredient, a receiver exterior to the bowl to receive the heavier ingredient discharged through its outlet, means providing a discharge passage opening at one end to the peripheral part of said separating compartment and at the other end to the outlet for the heavier liquid and otherwise closed against admission and discharge of liquid, and heating means to heat said passage to a temperature above that within the separating compartment.

13. In a centrifugal bowl for separating ingredients one of which is relatively resistant to flow, the combination with a separating compartment, of means providing a series of similar discharge passages arranged with substantial uniformity around the axis of the bowl for conveying such ingredient to the outside of the bowl, and means to apply heat locally to said passages.

14. In a centrifugal bowl for separating ingredients one of which is relatively resistant to flow, the combination with a separating compartment, of means providing a plurality of similar passages for discharging said ingredient from the separating compartment, and means to supply substantially equal quantities of heat to the several passages.

15. In a centrifugal bowl for separating ingredients one of which is relatively resistant to flow, the combination with a separating compartment, of means providing a series of similar discharge passages arranged with substantial uniformity around the axis of the bowl for conveying such ingredient to the outside of the bowl, and means to supply substantially equal quantities of heat to the several passages.

16. In a centrifugal bowl for separating ingredients one of which is relatively resistant to flow, the combination with a separating compartment, of means providing a discharge passage for conveying such ingredient from said separating compartment to the bowl outlet, and electrical heating means arranged to supply heat locally to said passage.

17. In a centrifugal bowl for separating ingredients one of which is relatively resistant to flow, the combination with a separating compartment, of means providing a series of similar discharge passages arranged with substantial uniformity around the axis of the bowl for conveying such ingredient to the outside of the bowl, and electrical heating means applied locally to the several passages and arranged to supply equal quantities of heat thereto.

18. In a centrifugal bowl provided with a separating compartment and outlets for the heavier and lighter ingredients respectively, of a tube leading to one of said outlets, an electric circuit, and a wire coil surrounding the tube and included in said circuit.

19. In a centrifugal bowl provided with a separating compartment in which the ingredients under centrifugal force are adapted to arrange themselves in different concentric zones, of a series of similar discharge tubes communicating with one of said zones and arranged with substantial uniformity around the bowl's axis, an electric circuit, and wire coils of similar capacities surrounding the respective tubes and included in said circuit.

In testimony of which invention, I have hereunto set my hand, at Poughkeepsie, N. Y., on this 12th day of February, 1923.

SELDEN H. HALL.